United States Patent [19]
Werner

[11] Patent Number: 5,938,478
[45] Date of Patent: Aug. 17, 1999

[54] JACK ASSEMBLY & PANEL SYSTEM

[75] Inventor: William R. Werner, Post Falls, Id.

[73] Assignee: Telect, Inc., Liberty Lake, Wash.

[21] Appl. No.: 09/018,926

[22] Filed: Feb. 5, 1998

[51] Int. Cl.[6] .................................................. H01R 17/18
[52] U.S. Cl. ............................................................. 439/668
[58] Field of Search ..................................... 439/188, 668

[56]  References Cited

U.S. PATENT DOCUMENTS

| | | | |
|---|---|---|---|
| 4,586,776 | 5/1986 | Ollis et al. | 439/736 |
| 4,737,113 | 4/1988 | Hopper et al. | 439/668 |
| 4,861,281 | 8/1989 | Warner . | |
| 4,975,087 | 12/1990 | Williams et al. . | |
| 5,439,395 | 8/1995 | Laukzemis | 439/668 |
| 5,634,822 | 6/1997 | Gunell | 439/669 |

*Primary Examiner*—Neil Abrams
*Assistant Examiner*—J. F. Duverne
*Attorney, Agent, or Firm*—Wells, St. John, Roberts, Gregory & Matkin, P.S.

[57]  ABSTRACT

Disclosed is a jack assembly (1) and a jack assembly (1) panel system for use in telecommunications equipment, as well as a method for manufacturing both. The jack assembly (1) is a one-piece, single-molded jack assembly and the method for making the jack assembly (1) involves placing the switch assemblies into the mold cavity and molding the framework with the switch assemblies in it. The jack assembly panel consists of numerous molded components which can be substantially snapped together for ease of assembly and resulting in a significant reduction in the number of assembly steps.

5 Claims, 10 Drawing Sheets

JACK ASSEMBLY & PANEL SYSTEM

TECHNICAL FIELD

This invention generally pertains to a jack assembly and a jack assembly panel, for use in telecommunications equipment, as well as a method for manufacturing both.

BACKGROUND OF THE INVENTION

Jack assemblies have been well known in the telecommunications industry for various applications, including without limitation, for digital signal cross connect ("DSX") equipment. Jack assemblies are typically used for the electrical connection between cables in a central office, for cross connecting and for the terminations of lines at various locations.

Each individual jack assembly is typically made from multiple separate components, which must then be assembled. Two examples of such an individual jack assembly is disclosed in U.S. Pat. No. 4,861,281, and U.S. Pat. No. 4,975,087, both of which are incorporated herein by this reference. When jack assemblies are assembled from multiple separate components, it is very labor intensive to achieve high quality and low tolerances.

A plurality of the individual jack assemblies are placed in a jack panel either individually or in modules. The typical panel assembly is a cabinet primarily constructed of metal components which are assembled with a large number of screws and assembly steps, which results in unnecessarily high labor costs.

The problem of high assembly costs has been previously recognized, but not heretofore sufficiently reduced. Prior attempts have included molding a first half of the jack assembly framework, placing the switch assemblies therein, and then gluing or welding the second half of the jack assembly framework to the first half. This results in unnecessary assembly steps, allows for greater assembly error and usually higher tolerances.

In the prior art systems wherein one-half of a plastic frame is attached to the second-half after the switch assemblies are placed therein, the typical way to place the two halves together is by ultrasonic welding. The vibration from ultrasonic welding creates problems in the contacts in the switch assemblies, and has led to extensive problems in the industry. Ultrasonic welding is therefore undesirable once the switch assemblies are in place. This invention eliminates the need for ultrasonic welding and the problems inherent therewith.

It is an object of this invention to greatly reduce the cost to make a jack assembly, and to reduce the number of component parts which are utilized in manufacturing the jack assembly. This invention accomplishes this objective by providing a one-piece jack assembly in which the switch assemblies are molded into the framework of the jack assembly.

It is also an object of this invention to greatly reduce number of assembly steps, as well as the time required to assembly a jack assembly. This objective is accomplished by placing the switch assemblies in the mold assembly, and molding the framework of the jack assembly with the switch assemblies in place in one step. This has the further advantage and feature of being a one-piece jack assembly framework.

It is a further object of this invention to provide a jack assembly panel which can be less expensively and more easily assembled. This invention achieves this objective by providing a panel which replaces some of the more labor intensive assembly steps, such as screwing a screw in, with snap in assembly steps. This invention further accomplishes this objective through the use of a plastic panel frame structure, as opposed to the metal frames that have been heretofore used. This invention therefore has the feature or advantage of reducing the time required to assemble the jack panel.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection and other means and components utilized in this invention are widely known and used in the field of the invention described, their exact nature or type is not necessary for an understanding and use of the invention by a person skilled in the art or science, and they will not therefor be discussed in significant detail.

Furthermore, the various components shown or described herein for any specific application of this invention can be varied or altered as anticipated by this invention and the practice of a specific application of any element may already be widely known or used in the art or by persons skilled in the art or science and each will not therefor be discussed in significant detail.

Figure 1:
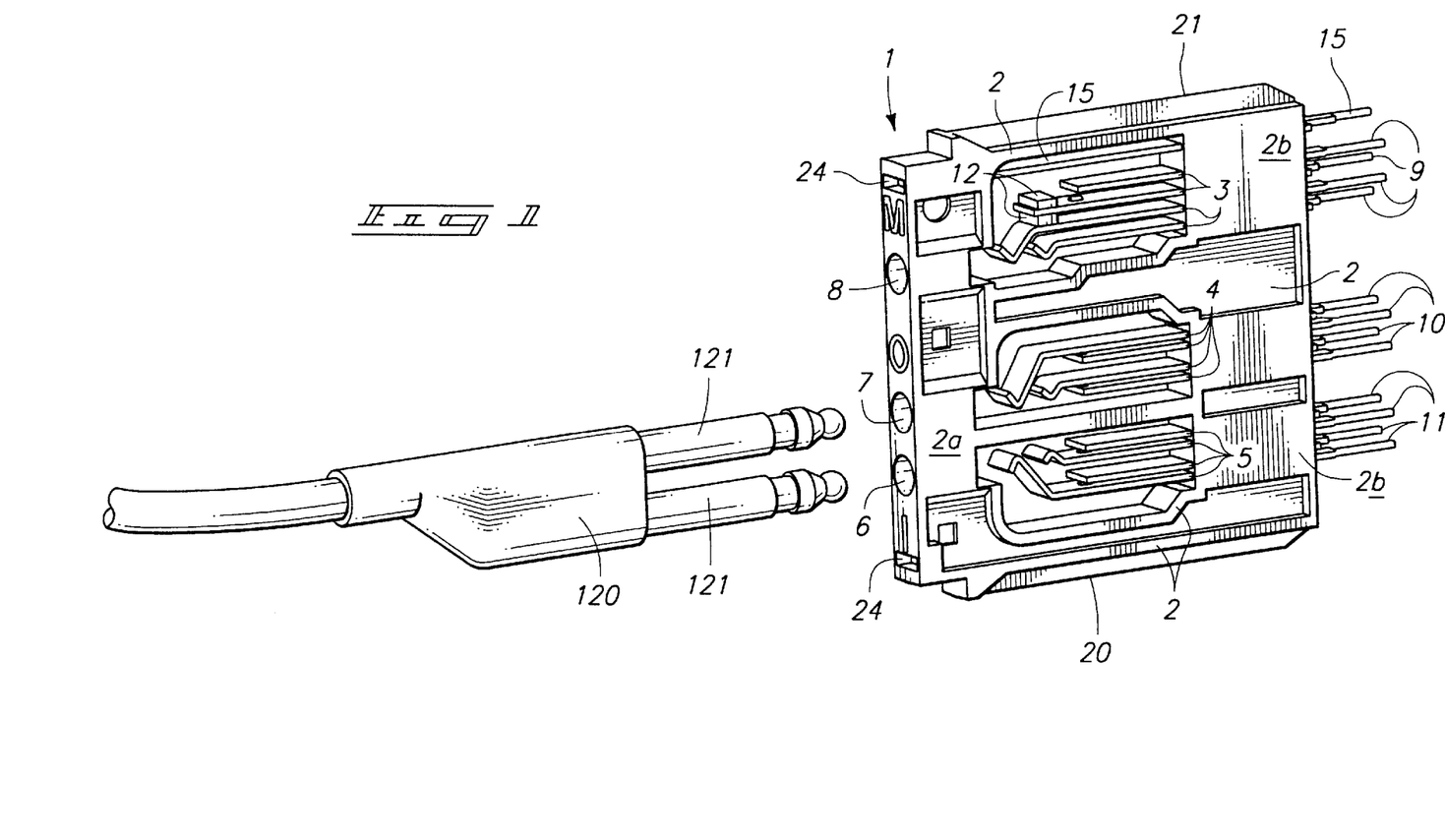
FIG. 1 is a front perspective view of one embodiment of a jack assembly provided by this invention.

FIG. 1 is a front perspective view of one embodiment of a jack assembly provided by this invention. FIG. 1 illustrates the jack assembly 1, showing it to include a one-piece framework 2. Jack assembly 1 is comprised of framework 2, which includes a switch assembly support portion 2b and a front panel portion 2a. The framework is one-piece in that it is not originally manufactured as two separate sections and later attached, welded or glued together. Instead, the framework is a one-piece homogenous structure.

FIG. 1 further shows switch assemblies 3, 4, and 5. In this embodiment of the invention, switch assembly 3 is shown positioned rearward of a corresponding monitor sleeve 8, and adapted to receive and make electrical contact with a plug which may be inserted in monitor sleeve 8. Similarly, switch assembly 4 is shown positioned rearward of a corresponding output sleeve 7, and adapted to receive and make electrical contact with a plug which may be inserted in the output sleeve 7. Lastly, switch assembly 5 is shown positioned rearward of a corresponding input sleeve 6, and adapted to receive and make electrical contact with a plug which may be inserted in the input sleeve 6.

Switch assemblies are well known in the industry and are typically comprised of a plurality of terminals, configured and adapted to receive and electrically connect to plugs inserted in the sleeves. Each terminal typically terminates in a pin configuration, as shown extending from the rear portion of the jack assembly 1.

Switch assembly 3 includes terminal pins 9, which are normally one piece with the contact portion of the switch assembly. Similarly, switch assembly 4 includes terminal pins 10, which are typically one piece with the contact portion of the switch assembly; and switch assembly 5 includes terminal pins 11, which are typically one piece with the corresponding contact portion of the switch assembly.

Switch assembly 3 is molded into the framework 2, and adapted to receive and make electrical contact with a plug 121 inserted into monitor sleeve 8. Switch assembly 4 is molded into framework 2, and adapted to receive and make electrical contact with a plug 121 which may be inserted into output sleeve 7. Switch assembly 5 is molded into framework 2, and adapted to receive and make electrical contact with a plug 121 which may be inserted into input sleeve 6.

FIG. 1 also illustrates a two or dual plug assembly 120 positioned in front of the input sleeve 6 and the output sleeve 7.

Switch assembly 5 is held and adapted to receive and make electrical contact with a plug inserted into input sleeve 6. Switch assembly 4 is held and adapted to receive and make electrical contact with a plug inserted into output sleeve 7.

FIG. 1 further illustrates switch assembly spacers 12 on the monitor switch assembly 3, which serve to space or insulate prongs within the switch assembly 3. These switch assembly spacers 12 are also molded into place.

Ground terminal 15 provides the grounding connection, and is electrically connected to the ground contacts 13 and 14. Ground terminal 15 terminates in a termination pin, which allows it to be electrically coupled to, and in contact with, the circuit board, as is more fully discussed below.

Figure 2:
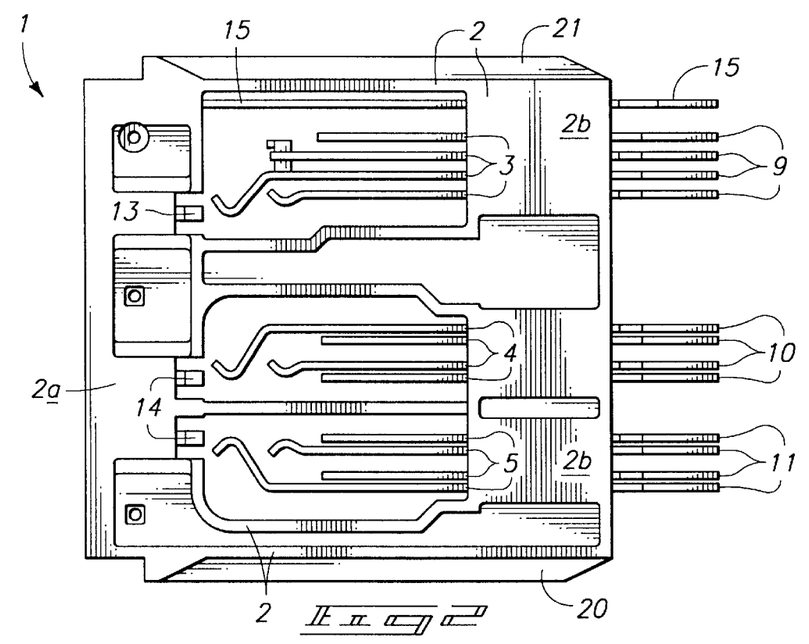
FIG. 2 is a side view of a first side of the embodiment of the jack assembly illustrated in FIG. 1.

FIG. 2 further illustrates the jack assembly 1, framework 2, with the front panel portion 2a of the framework 2 and the switch assembly support portion 2b of the framework 2. Further illustrated are switch assembly 3, which is held within framework 2, to receive and make electrical contact with the monitor plug which is placed through monitor sleeve 8. Switch assembly 4 is held within framework 2, such that it is adapted to receive and make electrical contact with a plug which is extended through output sleeve 7. Switch assembly 5 is held within framework 2, and adapted or configured to receive and make electrical contact with a plug extended through input sleeve 6.

Also illustrated is ground contact 14, which is configured and adapted to provide ground for a plug inserted through either or both of the input sleeve 6 or the output sleeve 7. Ground contact 13 is similarly configured, and adapted to make electrical contact with a plug inserted through monitor sleeve 8. Ground contacts 13 and 14 are actually one piece or one strip of ground conductor.

Ground terminal 15 provides the grounding connection to the circuit board for ground contact 13 and ground contact 14, which are both electrically coupled to ground terminal 15.

Switch assembly 3 has termination pins 9 to electrically connect and contact switch assembly 3 to the circuit board. Switch assembly 4 has termination pins 10 to electrically connect and contact switch assembly 4 to the circuit board. Switch assembly 5 has termination pins 11 to electrically connect and contact switch assembly 5 to the circuit board.

Figure 3:
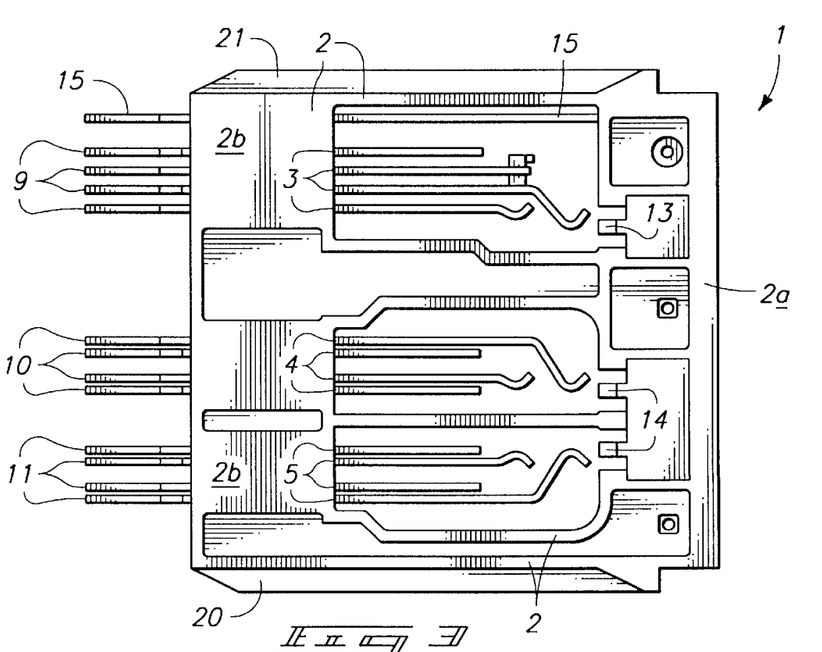
FIG. 3 is a side view of a second side of the embodiment of the jack assembly illustrated in FIG. 1.

FIG. 3 illustrates a second side view of jack assembly 1, illustrating framework 2, the front panel portion 2a of framework 2 and the switch assembly support portion 2b of framework 2.

FIG. 3 illustrates the same basic elements as shown and described in reference to FIG. 2. Ground plate 13 is provided to make electrical contact with a plug extending through monitor sleeve 8 and ground contact 14 is configured to make contact with plugs extending through either input sleeve 6 or output sleeve 7. Ground plate or contact 13 and 14 are electrically connected to ground terminal 15, as shown in FIG. 3.

Figure 4:
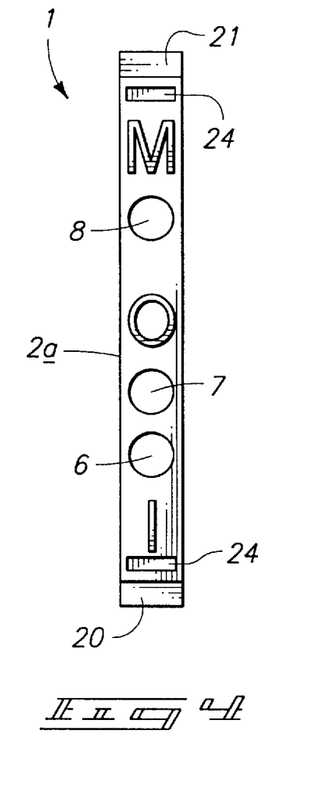
FIG. 4 is a front view of the embodiment of the jack assembly illustrated in FIG. 1.

FIG. 4 is a front view of the jack assembly 1, and illustrates the front panel portion 2a of framework 2, sleeves 6, 7, and 8, and placement rails 20 and 21.

Further illustrated in FIG. 4 is panel support 24, which is an indent or a slot in the illustrated embodiment. However, it need not be recessed or indented, but instead the panel support on the jack assembly may also be a recessed or a protruding structure which can potentially be used as a support for the top panel.

Figure 13:
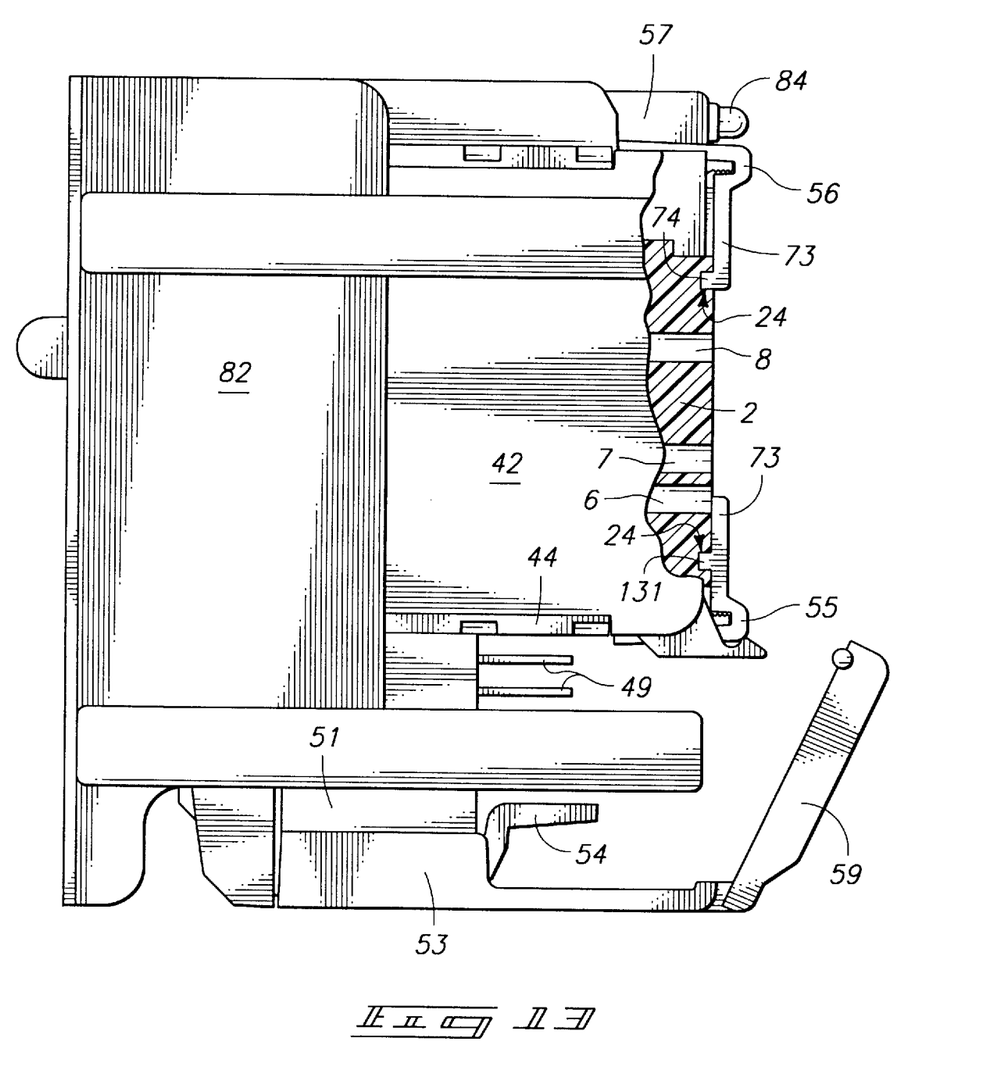
FIG. 13 is a side view of the embodiment of the jack assembly panel illustrated in FIG. 10.

Clip structure 73 with hooks 74 are inserted into the panel support 24, to provide structural support and prevent bending or sagging of the top and bottom panels of the jack assembly panel structure, as shown more fully in FIG. 13. The hook 74 portion of the clip structure 73 is placed into panel support 24.

Figure 5:
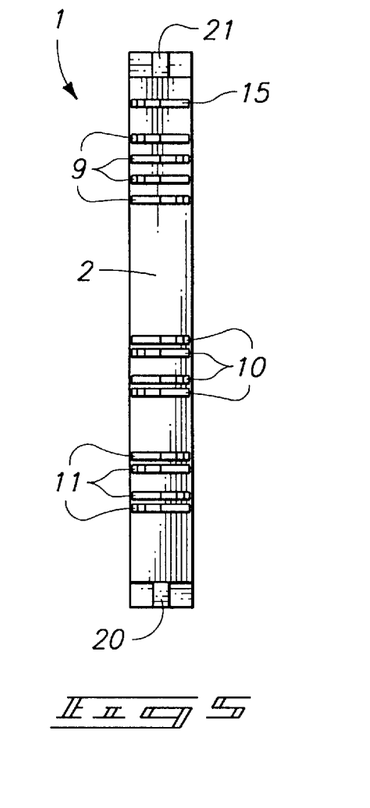
FIG. 5 is a rear view of the embodiment of the jack assembly illustrated in FIG. 1.

FIG. 5 is a rear view of jack assembly 1 illustrating framework 2, terminal pins 9, 10, and 11, and ground terminal 15. Placement rails 20 and 21 are also shown.

Figure 6:
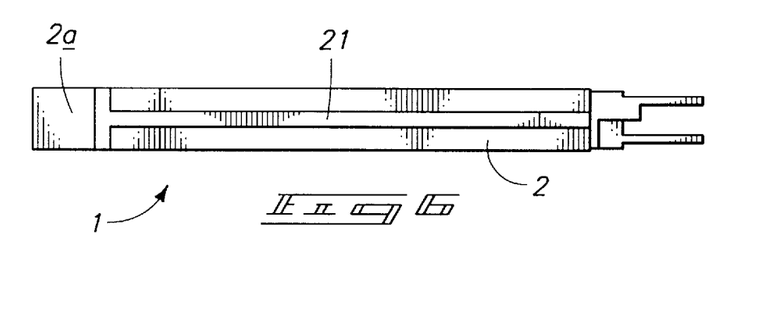
FIG. 6 is a bottom view of the embodiment of the jack assembly illustrated in FIG. 1.

FIG. 6 is a bottom view of the jack assembly 1 and illustrates placement rail 21, front panel portion 2a of framework 2, and framework 2.

Figure 7:
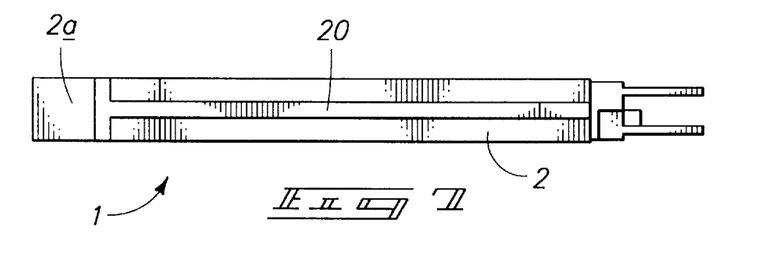
FIG. 7 is a top view of the embodiment of the jack assembly illustrated in FIG. 1.

FIG. 7 is a top view of jack assembly 1, illustrating framework 2 and the front panel portion 2a of framework 2.

FIG. 7 further illustrates placement rail 20 and placement rail 21. Placement rails 20 and 21 are part of framework 2 and serve to align and place the jack assembly within the jack assembly panel, between the top panel and the bottom panel, as more fully shown in FIG. 10 and described below.

The jack assembly panel has corresponding placement rails between which placement rails 20 and 21 are slid to place and retain the jack assemblies.

Figure 8:
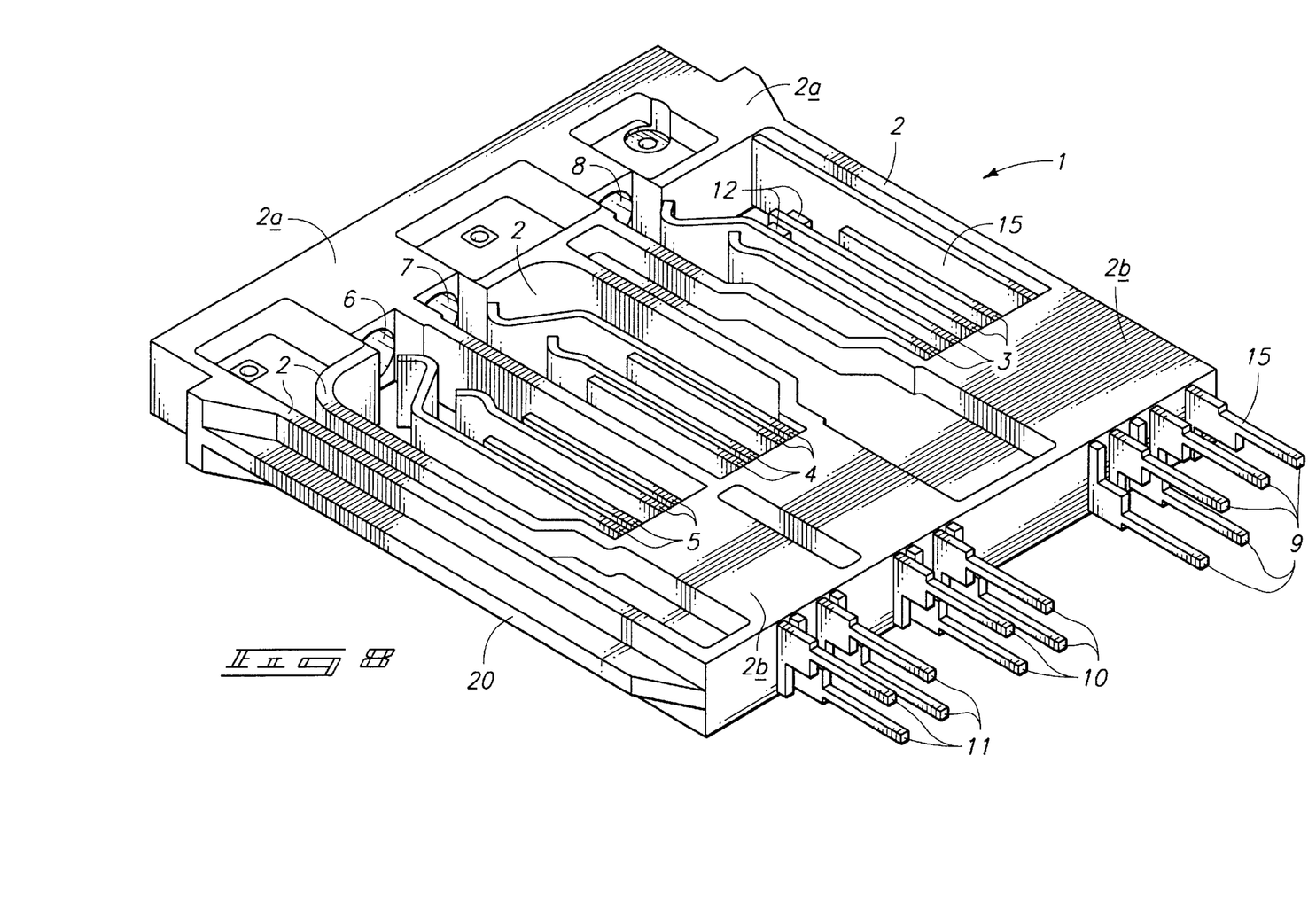
FIG. 8 is a rear perspective view of the jack assembly illustrated in FIG. 1.

FIG. 8 is a rear perspective view of the embodiment of the jack assembly illustrated in FIG. 1. FIG. 8 illustrates the jack assembly 1, showing it to include a one-piece framework 2. Jack assembly 1 is comprised of framework 2, which includes a switch assembly support portion 2b and a front panel portion 2a.

FIG. 8 further shows switch assemblies 3, 4, and 5. In this embodiment of the invention, switch assembly 3 is shown positioned rearward of a corresponding monitor sleeve 8, and adapted to receive and make electrical contact with a plug which may be inserted in monitor sleeve 8. Similarly, switch assembly 4 is shown positioned rearward of a corresponding output sleeve 7, and adapted to receive and make electrical contact with a plug which may be inserted in the output sleeve 7. Lastly, switch assembly 5 is shown positioned rearward of a corresponding input sleeve 6, and adapted to receive and make electrical contact with a plug which may be inserted in the input sleeve 6.

Switch assembly 3 includes terminal pins 9, which are normally one piece with the contact portion of the switch assembly. Similarly, switch assembly 4 includes terminal pins 10, which are typically one piece with the contact portion of the switch assembly; and switch assembly 5 includes terminal pins 11, which are typically one piece with the corresponding contact portion of the switch assembly.

Switch assembly 3 is molded into the framework 2, and adapted to receive and make electrical contact with a plug inserted into monitor sleeve 8. Switch assembly 4 is molded into framework 2, and adapted to receive and make electrical contact with a plug 121 which may be inserted into output sleeve 7. Switch assembly 5 is molded into framework 2, and adapted to receive and make electrical contact with a plug 121 which may be inserted into input sleeve 6.

Switch assembly 5 is held and adapted to receive and make electrical contact with a plug inserted into input sleeve 6. Switch assembly 4 is held and adapted to receive and make electrical contact with a plug inserted into input sleeve 7.

FIG. 8 further illustrates switch assembly spacers 12 on the monitor switch assembly 3, which serve to space or insulate prongs within the switch assembly 3.

Ground terminal 15 provides the grounding connection, and is electrically connected to the ground contacts 13 and 14. Ground terminal 15 terminates in a termination pin, which allows it to be electrically coupled to, and in contact with, the circuit board, as discussed more fully discussed below.

Figure 9:
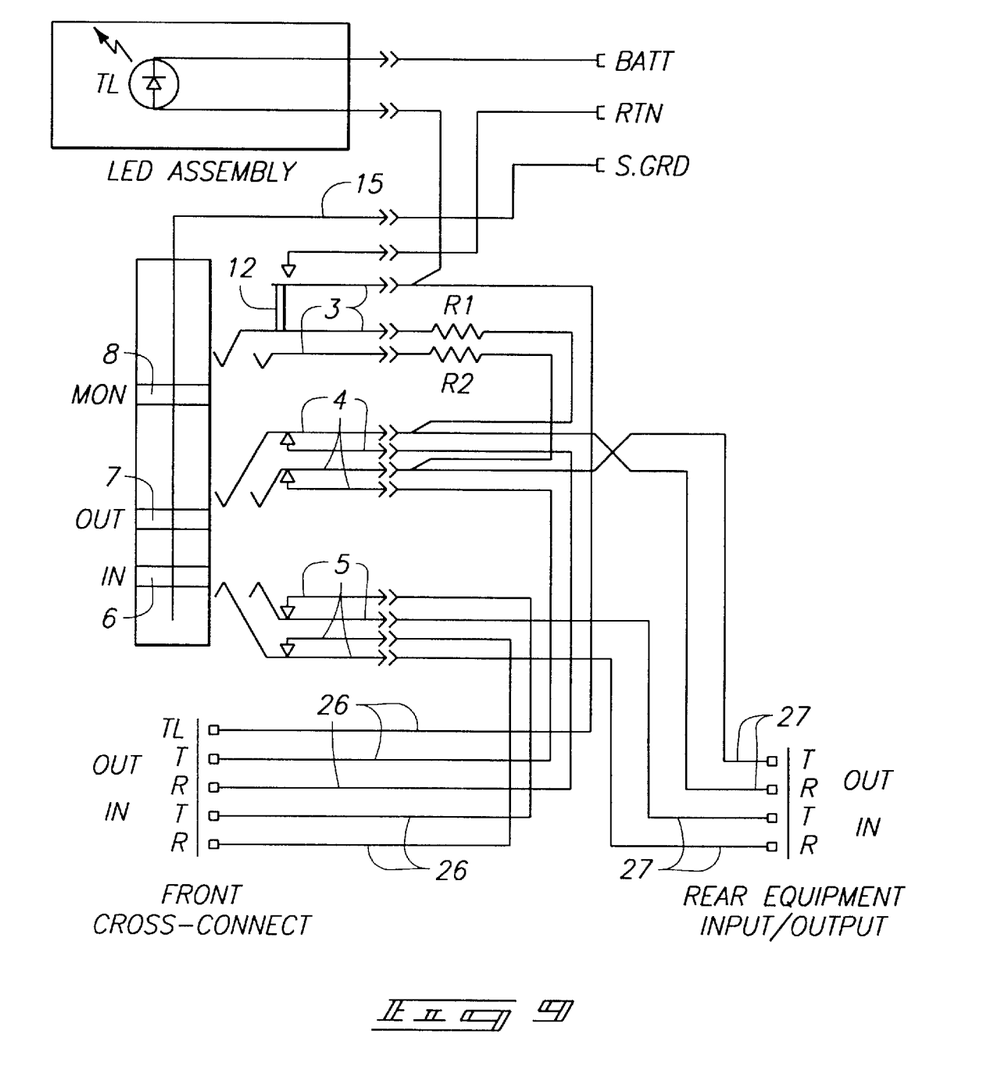
FIG. 9 is a schematic electrical diagram of the jack assembly illustrated in FIG. 1.

FIG. 9 shows a schematic electrical representation of the jack assembly 1.

Apertures in the front panel portion 2a of framework 2 are depicted as sleeves 6, 7, and 8. Switch assemblies 3, 4, and 5 are schematically depicted, as is ground terminal 15. Switch assembly spacer 12 is also schematically depicted within switch assembly 3.

There are terminal pins which extend through a cross connect housing for the front cross connect as shown and more fully described with reference to FIGS. 9 and 10. Schematic lines 26 and 27 depict the electrical connections to the front terminal pin and to the rear equipment input and output terminal pins. A specific electrical scheme is not necessary to practice this invention, as there are several known configurations which may be used in the practice of this invention.

Figure 10:
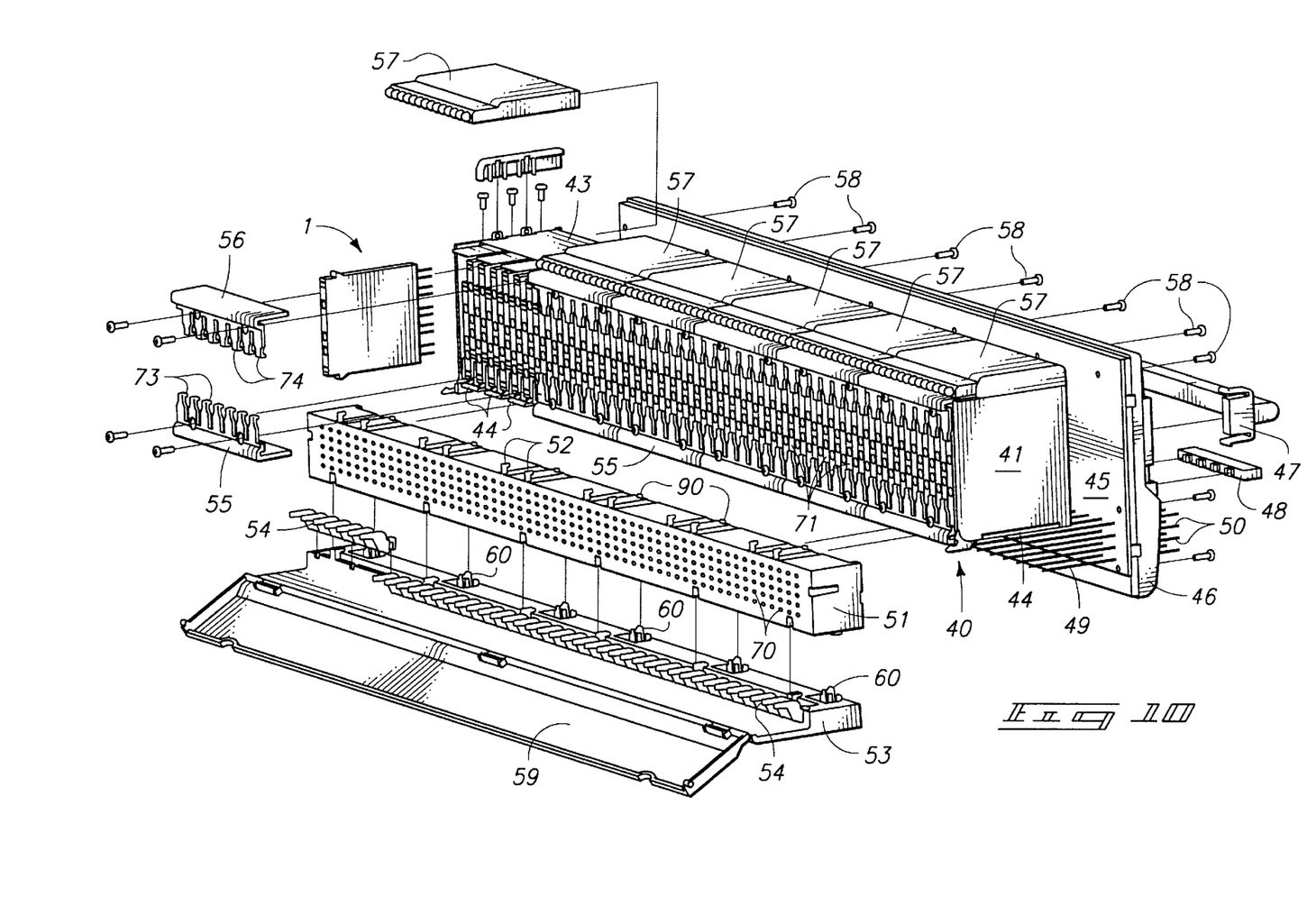
FIG. 10 is an exploded perspective view of one embodiment of the jack assembly panel provided by this invention.

FIG. 10 is an exploded view of the jack assembly panel with exemplary jack assemblies inserted therein. FIG. 10 illustrates framework 40, which includes right panel 41, top panel 43, bottom panel 44, and rear panel 46. Mounted to circuit board 45 are front terminal (or cross connect) pins 49, which are typically used for cross connecting, and which extend through cross connect housing 51. Also mounted to circuit board 45 are rear terminal (or input-output) pins 50, which are typically used for electrical connection to equipment, both into and out of the circuit board. The rear terminal pins extend through pin apertures 130 in the rear panel 46. Circuit board 45 is sandwiched between framework 40 and rear panel 46 for assembly, and screws 58 are utilized to attach rear panel 46 and circuit board 45 to framework 40.

Front tray cover 59 is rotatably attached to front tray assembly 53. Front tray assembly 53 includes cantilever snap fit attachment 60 to allow front tray assembly 53 to be snap fitted to and with cross connect housing 51. Cross connect housing 51 has a plurality of apertures corresponding to the cantilever snap fit attachments 60, which are adapted to receive and snap fit to the snap fit attachments 60. Cross connect housing 51 further includes slide fit adapters 52 to allow cross connect housing 51 to be slid into and interconnected with the bottom panel 44 of framework 40.

In the embodiment shown, fanning strips 54 are slid onto and thereby attached to front tray assembly 53, as shown.

Jack assemblies 1 are slid into any of the jack assembly apertures 71, as illustrated. Once the jack assemblies 1 are inserted into jack assembly aperture 71, top face place 56 can be attached to framework 40 and bottom face plate 55 can be attached to framework 40, as shown. Face plates 55 and 56 include clip structures 73, which further include hooks 74.

As face plates 55 and 56 are attached to framework 40, hooks 74 engage into panel support 24 on the front face of jack assembly 1. It should be noted that there are two panel supports 24 in each jack assembly 1, and therefore face plate 55 hooks into or engages a panel support 24 in every jack assembly in the panel, as does face plate 56.

The end effect of clips 73 engaging in panel support 24 in jack assemblies 1 is that if there is a bending force placed on top panel 43, the jack assemblies 1 provide structural support to prevent excessive bending of said panel. This support is provided not only through framework 2 of jack assembly 1, but also provided through the engagement of clips 73 and their respective hooks 74 into panel support 24 of jack assembly 1. Another advantage of the face plates is they further serve to retain the jack assemblies in place. For cable management, fanning strips 48 are attached to rear panel 46.

It is also desirable to provide LED displays to give the operator a visual display of certain operations, and LED display module 57 can be attached by extending terminal pins through circuit board 45, by hooks which engage the top panel, as shown in FIG. 10. The LED display module 57 is slid into place, engaging the circuit board with the terminal pins and hooking into the top panel with hooks on the bottom side of the display module 57. A portion of face plate 56 includes a structure which prevents the display module 57 from being slid back out when face plate 56 is installed. Tie bar 47 is also attached to rear panel 46, by cantilever snaps.

Figure 11:
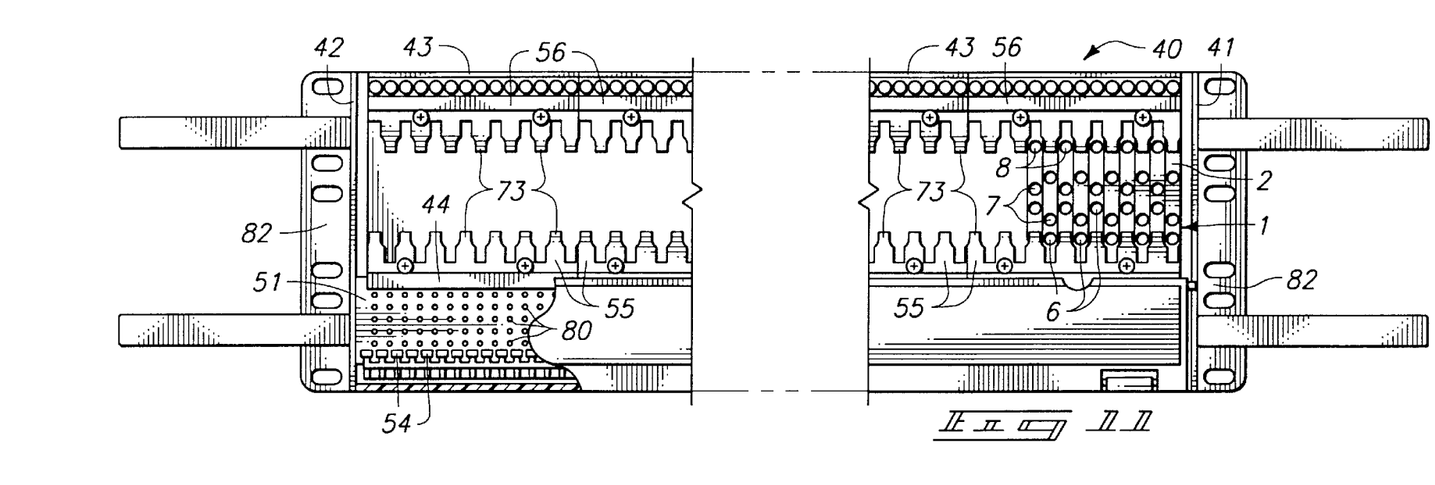
FIG. 11 is a front view of the embodiment of the jack assembly panel illustrated in FIG. 10.

FIG. 11 is a front view of the jack assembly panel as assembled. FIG. 11 illustrates two jack assemblies 1 inserted into respective jack assembly apertures 71. The jack assemblies include framework 2 and sleeves 6, 7, and 8. Top face plate 56 is inserted over the jack assembly such that the hooks of clip structure 73 engage panel support 24 of jack assembly 1 to retain the jack assembly in place and to help utilize it for any necessary structural support. Bottom face plate 55 is similarly installed and utilized.

FIG. 11 also illustrates left panel 42, and right panel 41, of framework 40. FIG. 11 further illustrates panel mounts 82 for mounting the jack assembly panel to a frame or other structure.

FIG. 11 further illustrates cross connect housing 51 and cross connect housing apertures 80 for receiving cross connect pins 49.

Figure 12:
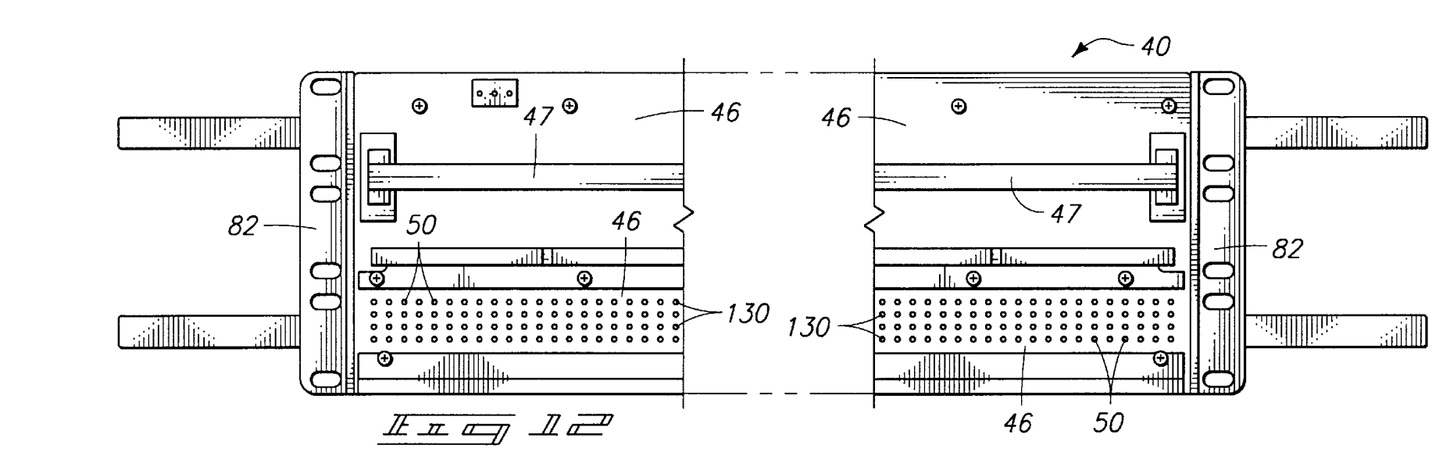
FIG. 12 is a rear view of the embodiment of the jack assembly panel illustrated in FIG. 10.

FIG. 12 is a rear view of the jack assembly panel, and illustrates framework 40, tie bar 47, and rear panel 46. FIG. 12 illustrates the various portions of rear panel 46, in including the pin apertures 130 in the rear panel 46, through which the input and output pins 50 extend through.

FIG. 13 is a side view of the jack assembly panel embodiment described herein and illustrates LED display assembly 57, LED light 84, top face plate 56 with clip 73, bottom face plate 55 with clip 73, cross connect pins 49, fanning strip 54, front tray cover 59, front tray assembly 53, cross connect housing 51, left panel 42, and bottom panel 44.

The cut-away portion of FIG. 13 illustrates how hook 74 of clip 73 inserts into panel support 24 at the upper side of the jack assembly, and how insert 131 of face plate 55 is placed into panel support 24 at the lower side of the jack assembly.

FIG. 13 further shows input sleeve 6, output sleeve 7 and monitor sleeve 8.

Figure 14:
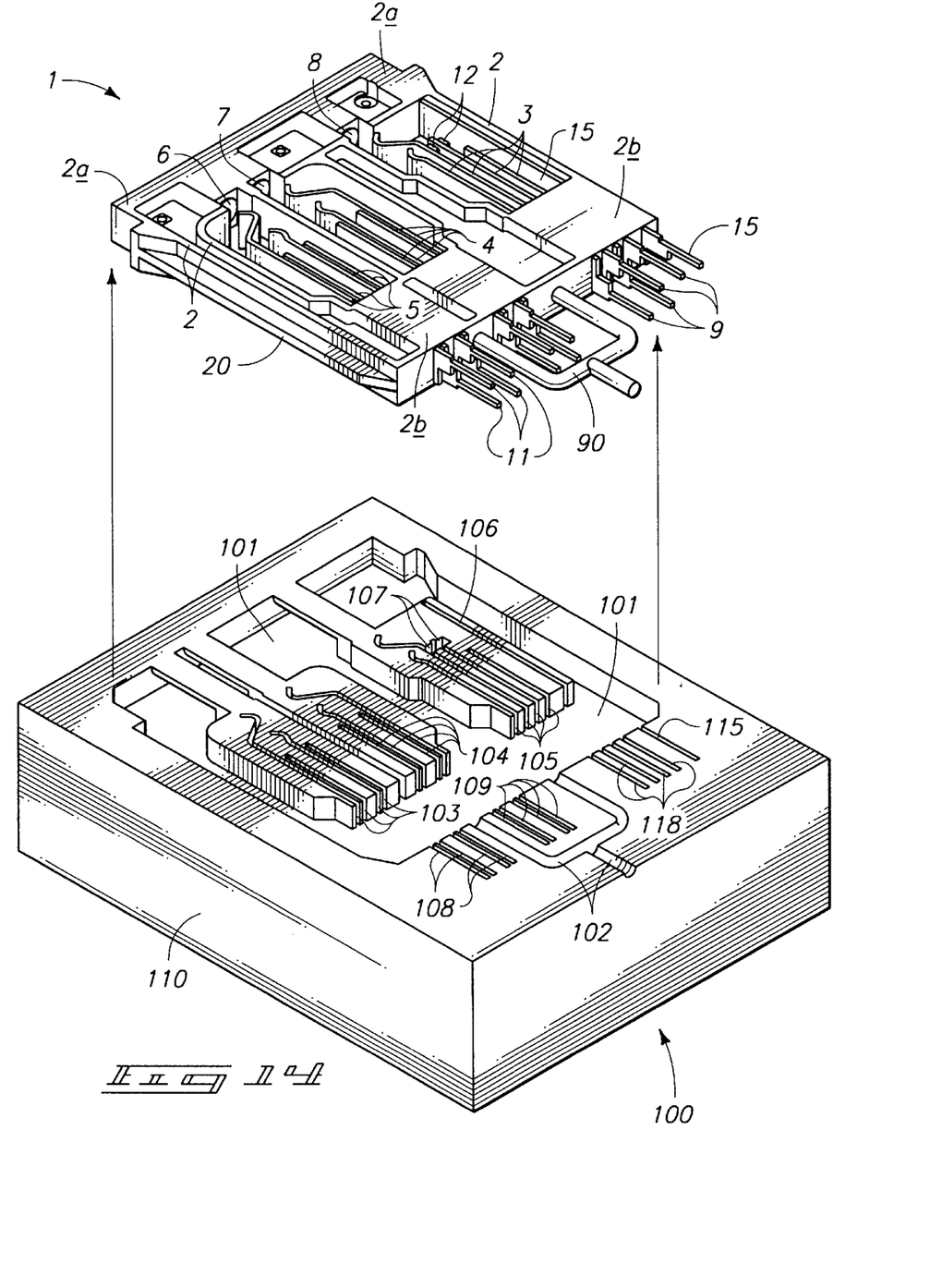
FIG. 14 is a perspective view of one embodiment of a mold assembly which may be utilized as part of this invention.

FIG. 14 is a perspective view of one embodiment of a mold assembly 100 which may be utilized as part of this invention, to make the jack assemblies. The lower mold assembly body 110 includes mold cavity 101, and certain structures to hold the various desired components. Shown are: first switch assembly holder 103; second switch assembly holder 104; and third switch assembly holder 105, for holding the switch assembly components in their respective predetermined positions.

Switch assemblies typically include terminal pins, and the mold assembly 100 includes holders to assure that the terminal pins are placed in their predetermined positions. FIG. 14 illustrates: first terminal pin holder 108; second terminal pin holder 109; and third terminal pin holder 118. Ground assembly holder 106 and ground terminal pin holder 115 are also illustrated, and hold the ground terminal during the molding process.

The embodiment of the mold assembly 100 shown further includes switch assembly spacer cavities 107, which serve to receive molten raw material to form the switch assembly spacers 12 during the molding process.

The mold assembly inlet 102 provides the path for the molten raw material to be supplied to the mold cavity 101. This invention is not limited to any specific raw material to be supplied into the mold cavity. The preferred raw material is known in the industry as bayblend FR110, which is an ABS polycarbonate blend.

In the injection mold assembly shown in FIG. 14, the parting line opens in a vertical plane. Once the raw material has been injected into the mold cavity and sufficient cooling has occurred, the top half of the mold is then lifted and the jack assembly 1 is then removed from the mold assembly 100, as shown in FIG. 14. The approximate time from clamp time to clamp time of this mold is approximately forty five seconds.

In addition to the components of the jack assembly described above with respect to other figures, FIG. 14 shows the slag piece 90 which generally conforms to the mold assembly inlet 102, and which is removed after the jack assembly 1 is removed from the mold cavity 101.

Figure 15:
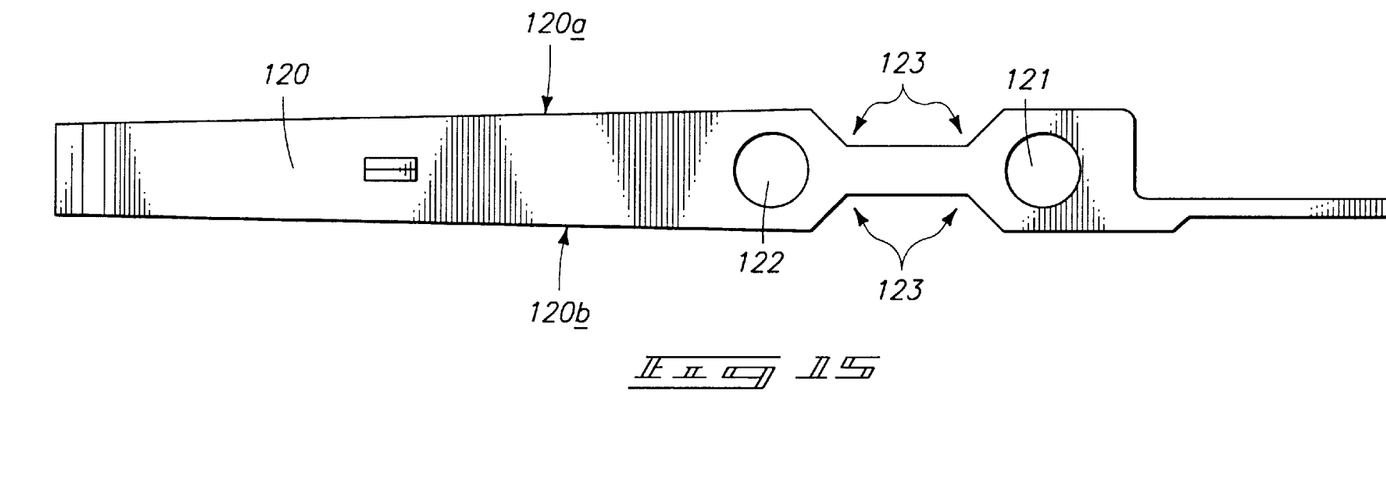
FIG. 15 is a top view of one embodiment of a terminal of a switch assembly which may be utilized in practicing this invention.

FIG. 15 is a terminal used in a switch assembly and is shown to illustrate one example of the holes and edges that could be used to secure the terminals and switch assemblies in place once the jack assembly is molded.

FIG. 15 illustrates one embodiment, the preferred embodiment, of a combination of holes and notches which may be used to secure the terminals or switch assemblies in place, as molded. Terminal 120 includes holes 121 & 122, and indents 123. When the terminal 120 is held in the mold assembly, and after the plastic is introduced and solidifies, the terminal 120 and consequently the switch assemblies, are molded into place. During molding, the molten injected raw material fills the holes 121 & 122, and indents 123. When the raw material solidifies, the solidified raw material in the indents 123 and through holes, secures the terminals 120 in the framework of the jack assembly.

The presence of the plastic or framework in the holes or in the indents, or both, secures the terminal in place in the framework in a longitudinal direction.

Terminal 120 also includes a first lateral side 120a and a second lateral side 120b, as shown in FIG. 15.

The spacers 12 shown in FIG. 1 for example are retained in place by a hole through the terminal of the switch assembly to which the spacers 12 are attached, in similar fashion to that stated above.

The jack assembly panel is generally assembled according to the following: providing a left panel, a right panel, a top panel, a bottom panel and a rear panel; screwing the left panel at an approximate ninety degree angle to the top panel and to the bottom panel; screwing the right panel at an approximate ninety degree angle to the top panel and to the bottom panel, to form a housing structure which is configured to receive jack assemblies; providing a wire management tray and a cross connect housing, the cross connect housing including pin apertures for receiving cross connect pins; snap fitting the wire management tray to the cross connect housing; snap fitting the cross connect housing to the bottom panel of the housing structure; providing a vertically oriented circuit board, configured to receive terminal pins from jack assemblies, and including cross connect pins extending through the circuit board, the cross connect pins being configured to extend through the pin apertures in the cross connect housing; positioning the circuit board between the top panel and the rear panel of the housing structure, such that the input output pins 50 mounted to the circuit board extend through the pin apertures 130 in the rear panel 46; fastening the circuit board and the rear panel, to the top and bottom panels of the housing structure, to the left panel and to the right panel; and inserting jack assemblies into the housing structure.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A jack assembly comprising:
   a. a one-piece molded jack assembly framework comprised of:
      i. a front panel portion which includes a single column of at least one sleeve for receiving a plug therein; and
      ii. a switch assembly support portion; and
   b. at least one switch assembly positioned within the framework rearward from the corresponding sleeve, the switch assembly being adapted to receive and make electrical contact with a plug inserted in the corresponding sleeve.

2. A jack assembly as recited in claim 1, and in which the switch assembly further comprises a plurality of terminals, and each terminal includes at least one hole through which the framework extends, wherein the presence of the framework through the hole longitudinally secures the terminal to the framework.

3. A jack assembly as recited in claim 1, and in which the switch assembly further comprises a plurality of terminals, each terminal including a first lateral side and a second lateral side, and further including at least one indent in either the first lateral side or the second lateral side, into which the framework extends, wherein the presence of the framework in the indent longitudinally secures the terminal to the framework.

4. A jack assembly panel, comprising:
   a. a housing structure, which includes a left panel, a right panel, a top panel, a bottom panel and a rear panel with a plurality of pin apertures, and which is configured to receive a plurality of jack assemblies;
   b. a circuit board vertically oriented between the rear panel and the top panel, configured to receive terminal pins from jack assemblies inserted into the housing structure, said circuit board having cross connect pins forwardly mounted thereon, and input-output pins mounted rearwardly thereon and positioned such that the input-output pins extend through the pin apertures in the rear panel;
   c. a cross connect housing including pin apertures configured to receive the cross connect pins mounted on the circuit board;
   d. a plurality of vertically oriented jack assemblies inserted into the housing structure, in direct contact with the top panel and the bottom panel, the jack assemblies each including at least one panel support;
   e. a top face plate attached at a first end to the top panel of the housing structure, and vertically restrained at a second end by its interaction with the top panel supports on the front face of the jack assemblies;
   f. a bottom face plate attached at a first end to the bottom panel of the housing structure, and vertically restrained at a second end by its interaction with the bottom panel supports on the front face of the jack assemblies.

5. A jack assembly panel as recited in claim 4, and in which the jack assembly further comprises:
   (a) a one-piece jack assembly framework, which is comprised of:
      (i) a front panel portion which includes a single column of at least two sleeves for receiving plugs therein; and
      (ii) a switch assembly support portion; and
   (b) switch assemblies mounted to the framework, rearward from the front panel, the switch assembles being adapted to receive and make electrical contact with the plugs inserted into corresponding sleeves.

* * * * *